United States Patent [19]

Cha

[11] Patent Number: 5,677,812
[45] Date of Patent: Oct. 14, 1997

[54] AIR BEARING SLIDER WITH VARIABLE SUB-AMBIENT PRESSURE CONTROL

[75] Inventor: Ellis T. Cha, Santa Clara, Calif.

[73] Assignee: Samsung Electronics, North America, San Jose, Calif.

[21] Appl. No.: 598,790

[22] Filed: Jan. 26, 1996

[51] Int. Cl.[6] .................................................. G11B 5/60
[52] U.S. Cl. ................................................... 360/103
[58] Field of Search ................................................ 360/103

[56] References Cited

U.S. PATENT DOCUMENTS

| | | | |
|---|---|---|---|
| 4,555,739 | 11/1985 | Le Van et al. | 360/103 |
| 4,673,996 | 6/1987 | White | 360/103 |
| 4,802,042 | 1/1989 | Strom | 360/103 |
| 4,870,519 | 9/1989 | White | 360/103 |
| 5,062,017 | 10/1991 | Strom et al. | 360/103 |
| 5,097,370 | 3/1992 | Hsia | 360/103 |
| 5,128,822 | 7/1992 | Chapin et al. | 360/103 |
| 5,200,868 | 4/1993 | Chapin et al. | 360/103 |
| 5,267,109 | 11/1993 | Chapin et al. | 360/103 |
| 5,287,235 | 2/1994 | Cunningham et al. | 360/103 |
| 5,309,303 | 5/1994 | Hsia et al. | 360/103 |
| 5,343,343 | 8/1994 | Chapin | 360/103 |
| 5,396,386 | 3/1995 | Bolasna et al. | 360/103 |
| 5,396,387 | 3/1995 | Murray | 360/103 |
| 5,404,256 | 4/1995 | White | 360/103 |

Primary Examiner—John H. Wolff
Attorney, Agent, or Firm—Blakely Sokoloff Taylor & Zafman

[57] ABSTRACT

An air bearing slider that maintains a relatively uniform flying height during variations in air speed and the skew of the slider. The slider has a raised rail disposed along the bottom surface of the slider body that forms a cavity. The cavity is configured to produce a subambient pressure when an air flow passes across the slider. The rail possesses a plurality of air bearing surfaces and has an opening positioned along the inner side of the slider. The opening is positioned and sized to provide a variable air flow into the cavity as the skew angle between the longitudinal axis of the slider and the direction of air flow changes. In this manner, a variable subambient pressure is developed within the cavity as the slider moves radially along the surface of a disk.

2 Claims, 4 Drawing Sheets

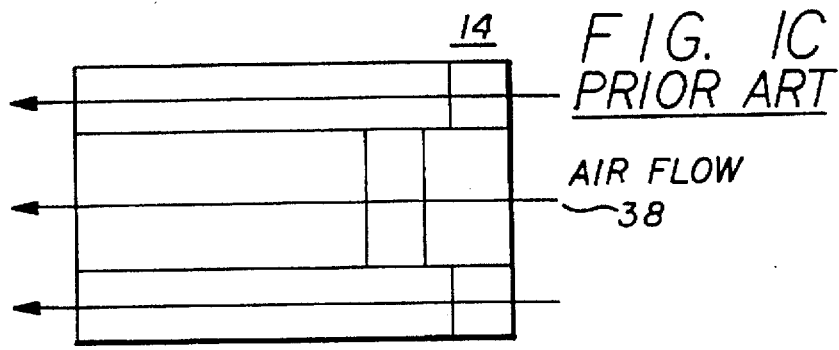
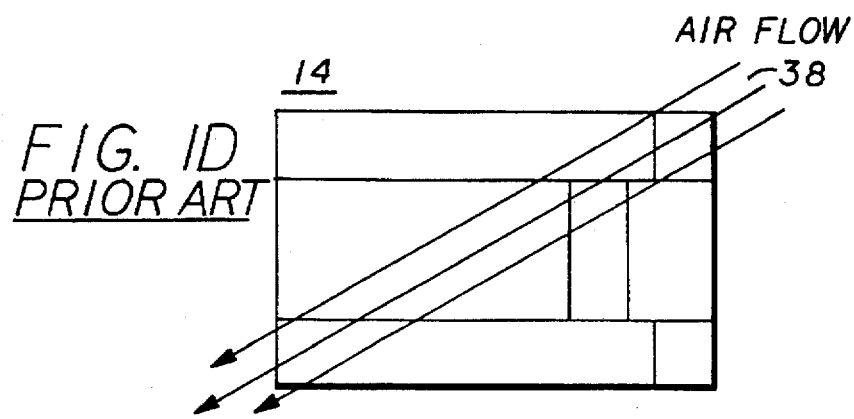
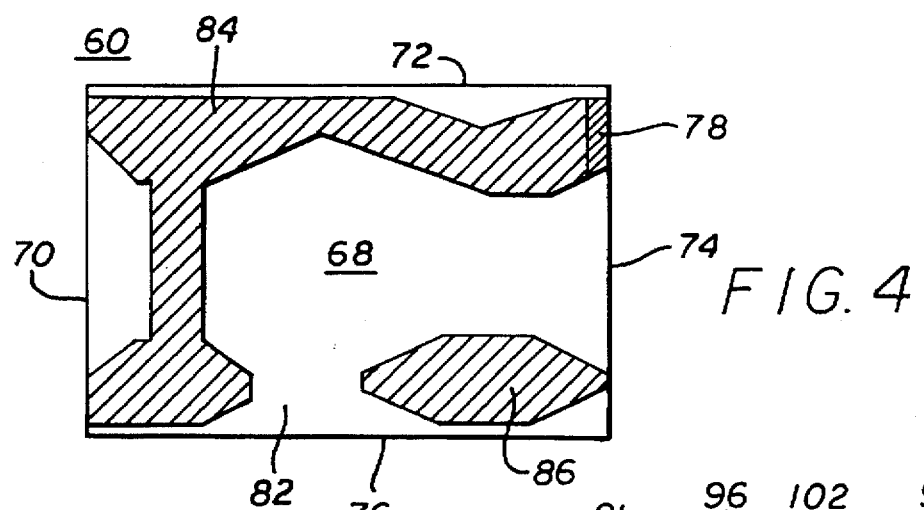
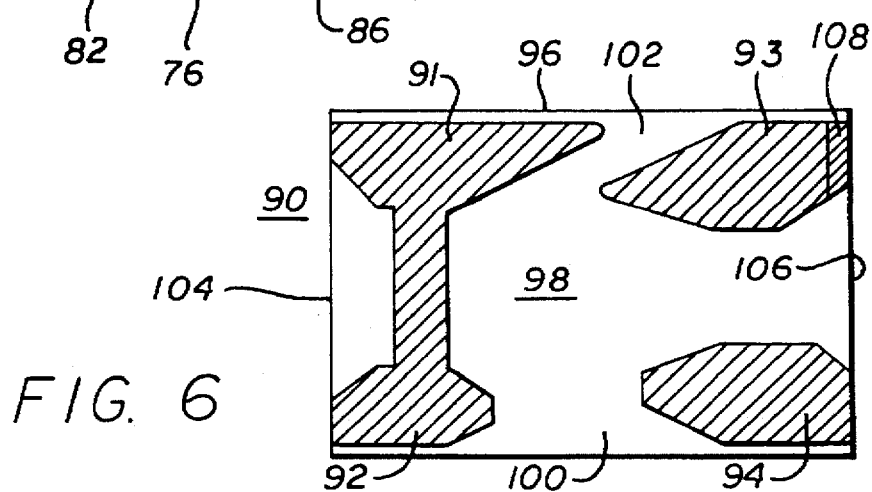

AIR BEARING SLIDER WITH VARIABLE SUB-AMBIENT PRESSURE CONTROL

FIELD OF THE INVENTION

This invention relates to air bearing sliders for use with rotating storage disk assemblies and, more particularly, to sliders having reduced sensitivity to variations in the direction of air flow passing between a slider and a rotating disk.

BACKGROUND OF THE INVENTION

Conventional magnetic disk drives include at least one rotatable magnetic disk with concentric data tracks and a transducer for reading and writing data on the various tracks. The transducer is integrated into a slider that is typically gimbal mounted to a flexure which is attached to a rotary arm. The arm is pivoted by a voice coil motor which moves the slider radially across the surface of the magnetic disk from one data track to another. During operation the rotation of the magnetic disk causes the transducer to be hydrodynamically lifted above the surface of the recording medium by an air bearing. This hydrodynamic lifting phenomena results from the flow of air produced by the rotating magnetic disk. It is this air flow which causes the slider to "fly" above the disk surface.

In magnetic recording technology, it is continually desired to improve the density at which information can be recorded and read. Recording density is a function of the air bearing height. It is desirable to fly a slider as close as possible to the magnetic medium with a uniform flying height despite variable flying conditions, such as speed variations from the inner radius to the outer radius of the disk, and skew caused by the rotary actuator.

It is well understood that the flying height of a slider is affected by the position of the slider along the disk's surface. This is due, in part, to the differences in the linear velocity of the air flow produced at varying disk radii. Because a slider typically flies higher as the air flow velocity increases, there is a tendency for sliders to fly higher at the outer radius of the disk. In an attempt to minimize this effect, many disk drives use subambient pressure sliders. FIG. 1A illustrates a conventional subambient pressure slider 14 in three different orientations relative to a disk 12 in a typical rotary actuated disk drive assembly 10. The slider 14 is positioned radially along the disk surface 13 from the inner radius 20 to the outer radius 22 by a rotary arm 16 that rotates about a fixed axis 18. As shown in FIG. 1 A, slider 14 is positioned at varying angles with respect to the direction of disk rotation as the slider moves radially over the disk surface. This angular orientation is referred to as the "skew" angle. More particularly, skew is a measure of the angle formed between the longitudinal axis 15 of the slider and the direction of the disk's tangential velocity 17. The skew angle is typically defined to be negative when the slider leading edge is rotated out, away from the disk center. Conversely, the skew angle is defined to be positive when the slider leading edge is rotated in, toward the disk center.

FIG. 1B shows a bottom view of slider 14 positioned along the inner radius 20 of the rotating disk (not shown). Slider 14 includes inner and outer rails 26 and 28 (each having a taper or step 30 formed along its leading end), a cross rail 32, a subambient pressure cavity 34, and a leading cavity 36. An air flow 38 is produced by the rotational movement of disk 12 in a direction running from the leading end of the inner rail to the trailing end of the outer rail. As a result of the air flow passing beneath slider 14, a pressurized air film is produced between air bearing surfaces 26 and 28 and the disk surface (not shown). The positive pressure generated by air bearing surfaces 26 and 28 is offset by a counteracting subambient pressure produced by cavity 34. In this manner, the net force acting upon slider 14 is reduced thereby limiting the over-all flying height of the slider as it travels from the inner radius 20 to the outer radius 22 of disk 12. FIGS. 1C and 1D shows the direction of air flow 38 when slider 14 is positioned along the center and outer radius of the disk surface, respectively.

Although conventional subambient pressure sliders offer some advantage by lowering the overall flying height of the slider, it offers no relief in the control of flying height variations due to changes in the direction of air flow or skew of the slider. This limitation imposes a restriction on the density at which information can be recorded and read onto a magnetic disk by requiring a greater nominal flying height to compensate for the velocity variations.

What is needed then is a subambient air bearing slider that is insensitive to variations in the skew angle of the slider.

SUMMARY OF THE INVENTION

An improved slider for a magnetic recording system is disclosed. The invention includes a subambient pressure air bearing slider that maintains a relatively uniform flying height during variations in the skew angle of the slider.

The slider has two raised rails disposed along the bottom surface of the slider body that form a cavity. The cavity is configured to produce a subambient pressure when an air flow passes across the slider. In one embodiment, one rail extends along the leading and outer edge of the slider body while the other rail extends along the inner edge of the slider body. An opening is disposed along the inner side of the slider body between the two rails. The opening is positioned and sized to provide a variable air flow into the cavity as the skew angle between the longitudinal axis of the slider and the direction of air flow changes between a negative and zero skew angle. In this manner, a variable subambient pressure is developed within the cavity as the slider moves radially along the surface of a disk to accommodate for air flow velocity variations, and more particularly, to variation in the direction of air flow.

BRIEF DESCRIPTION OF THE DRAWINGS

The present invention is illustrated by way of example and is not limited by the figures of the accompanying drawings, in which like references indicate similar elements, and in which:

FIG. 1C illustrates the slider of FIG. 1B having a zero skew angle relative to the direction of air flow.

FIG. 1D illustrates the slider of FIG. 1B having a positive skew angle relative to the direction of air flow.

FIG. 4 illustrates a bottom view of the slider shown in FIG. 3.

FIG. 6 illustrates a bottom view of a slider in another embodiment of the present invention.

DETAILED DESCRIPTION

A slider for use in a high density recording systems is described. In the following description, numerous specific details are set forth such as material types, dimensions, processing steps, etc., in order to provide a thorough understanding of the present invention. However, it will be obvious to one of skill in the art that the invention may be practiced without these specific details. In other instances, well known elements and processing techniques have not been described in particular detail in order to avoid unnecessarily obscuring the present invention.

Figure 1A:
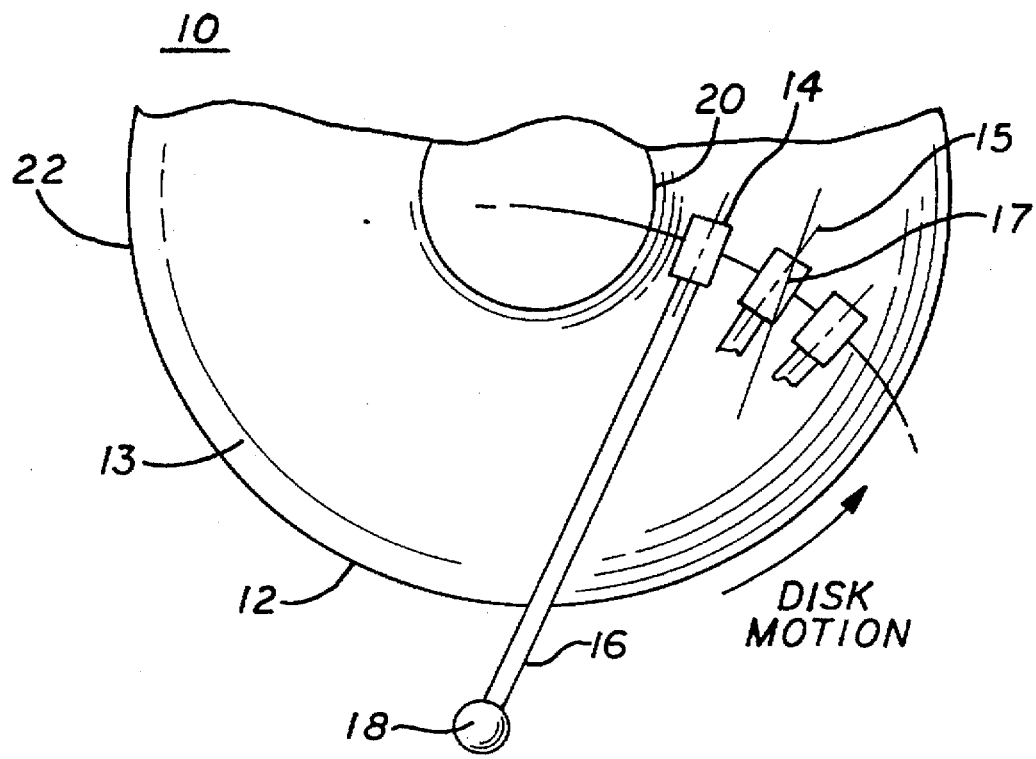
FIG. 1A illustrates a perspective view showing a slider in three different orientations relative to a disk in a typical rotary actuated disk drive assembly.
Figure 1B:
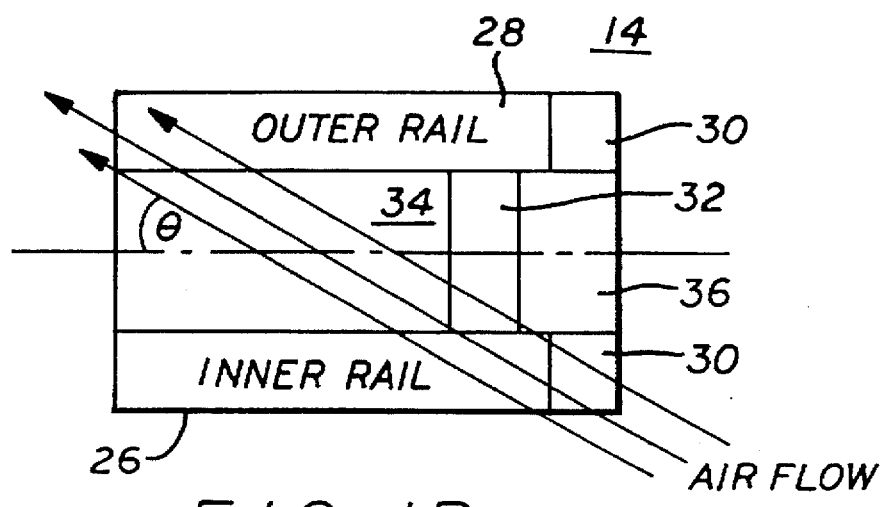
FIG. 1B illustrates a bottom view of a typical subambient pressure slider having a negative skew angle relative to the direction of air flow.
Figure 2:
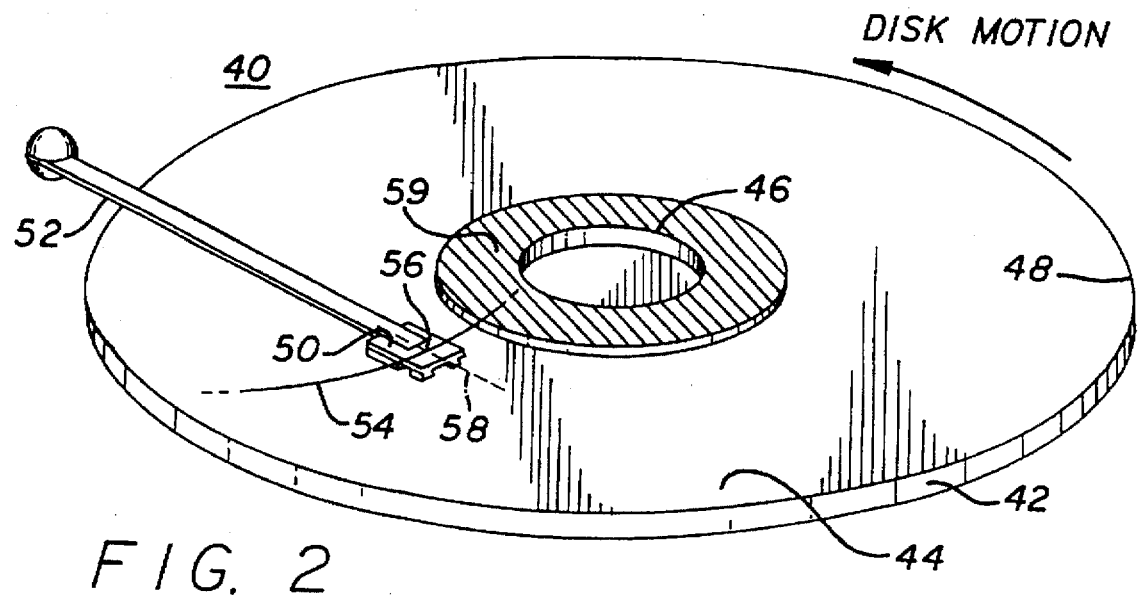
FIG. 2 illustrates a perspective view showing a slider of one embodiment of the present invention flying above the surface of a disk.

FIG. 2 illustrates a magnetic recording assembly 40 of the present invention. Assembly 40 includes a disk 42 having a surface 44 which extends from an inner radius 46 to an outer radius 48. A transducer (not shown) for writing and reading of information to and from disk 42 is mounted to a slider 50. Slider 50 is mounted on a positioning arm/suspension assembly 52. Arm 52 is connected to and driven by a rotary actuator (not shown) that is capable of positioning slider 50 at any point along an arc 54 extending from inner radius 46 to outer radius 48. When the slider is positioned at point 56, approximately midway along arc 54, the longitudinal axis 58 of slider 50 is tangential to the direction of rotation of disk 42, with a zero skew angle. At other positions of arm 52, the slider is at a skew angle to the tangent. For example, when slider 50 is positioned nearer the inner radius of disk 22, the slider is at a negative skew angle to the tangent. When slider 50 is positioned nearer the outer radius of disk 22, the slider is at a positive skew angle to the tangent. It is appreciated that the direction of the air flow generated by the rotational movement of disk 22 is approximately parallel to the tangent. Note. also, that a landing pad 59 is provided along the inner radius of disk 42. Landing pad 59 comprises a raised textured region on which slider 50 rests when the disk drive is not operating. The purpose of the landing pad is to reduce problems associated with stiction and wear along the disk surface during start-up.

In conventional subambient pressure slider designs, as the velocity of air passing across the slider changes, so does the hydrodynamic pressure generated by the slider air bearing surfaces. Since the linear air flow velocity produced at a point on a rotating disk is a function of the radial position, the air flow velocity will vary across the disk surface. As a consequence, the slider will fly over the disk surface at varying heights as it is moved radially along the disk surface. The air flow velocity produced at a point near the outer radius of a disk is greater than the velocity produced at a point near the inner radius of the disk. As a result, there is a tendency for sliders to fly high at the outer radius of the disk and low at the inner radius of the disk. This phenomena imposes a restriction on the density at which information may be recorded and read onto a magnetic disk by requiring a greater nominal flying height to compensate for the variation in air flow velocities.

Figure 3:
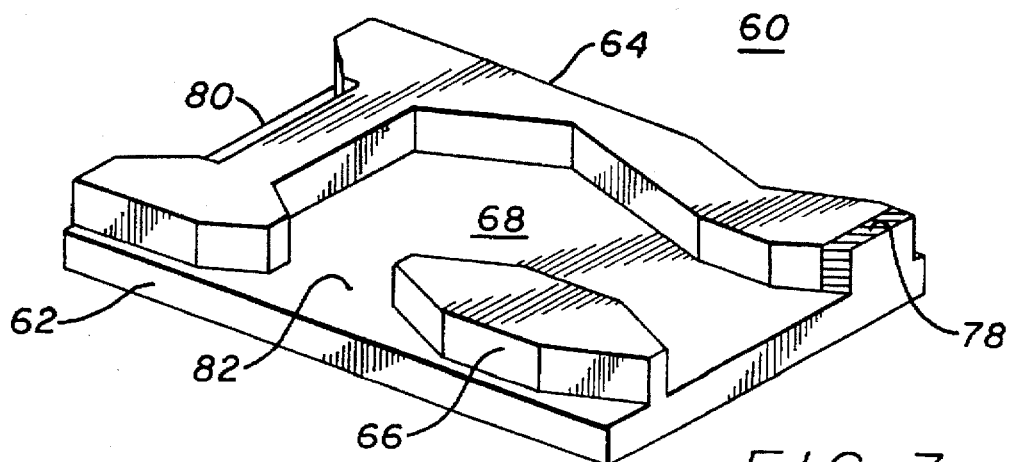
FIG. 3 illustrates a perspective view showing a slider of one embodiment of the present invention.

FIGS. 3 and 4 illustrate a slider 60 of the present invention. As shown, slider 60 includes a rectangular body 62 onto which is formed two rail sections 64 and 66 that define a cavity 68. A recess 80 is formed along the leading edge 70 of slider 60 for pressurizing the air between the slider and the disk surface 44. In lieu of recess 80, a tapered region may be used to obtain similar results.

Each rail section of slider 60 includes a working surface 84 and 86. These surfaces function as the primary air bearing surfaces of the slider during normal operation. Air flowing between the disk and slider passes under rails 64 and 66 to create a pressure under the rails to lift the slider above the disk's surface. In one embodiment, rail 64 extends along the leading end 70 and outer side 72 of slider body 60. Rail 66 is positioned near the trailing end 74 of the slider and extends along the inner side 76 of body 60. A transducer 78 for reading and writing of information to disk 42 is attached to or embedded within rail 64. Rails 64 and 66, and recess 68 are formed by etching, ion milling or other techniques as are known in the art. Air flowing through cavity 68 is intended to create a counteracting subambient pressure to draw the slider toward the disk surface. Although this results in lower obtainable flying heights, it does not solve those problems associated with variations in the skew angle of the slider. As previously discussed, the velocity of the air flow generated by a rotating disk changes along the radial position of the disk. This results in slider flying height variations as the slider moves from one radial position to another along the disk's surface. To address this problem, the slider of the present invention includes an opening 82 into cavity 68 that is positioned along the inner side 76 of slider body 60 between rails 64 and 66. Opening 82 is positioned and sized to provide a variable air flow into cavity 68 as the skew angle between the longitudinal axis of the slider and the direction of air flow changes between a negative skew angle and a zero skew angle. By providing a variable air flow into cavity 68 through opening 82, the negative (subambient) pressure developed by the cavity may be controlled as a function of skew angle. For example, when slider 60 is positioned along the inner radius of the disk, the skew angle will be at its maximum negative value. In this position, the air flow into cavity 68 through opening 82 will be at a maximum. As a result, the spoiling of the negative pressure produced by cavity 68 will also be at a maximum. As the slider moves away from the inner radius toward the center of the disk the spoiling of the negative pressure diminishes as the skew of the slider changes from a negative skew angle to a zero skew angle. As the slider continues to move toward the outer radius of the disk, a positive skew angle will exist between the slider and the direction of air flow with little or no air flow passing into cavity 68 through opening 82. Therefore, in accordance with the present invention, the negative pressure generated by cavity 68 is controlled to compensate for the change in air flow direction as the slider moves radially across the surface of the disk. In this manner, the net force acting upon the slider is controlled to reduce the over-all flying height variation of the slider as it travels from the inner radius to the outer radius of the disk.

Figure 5A:
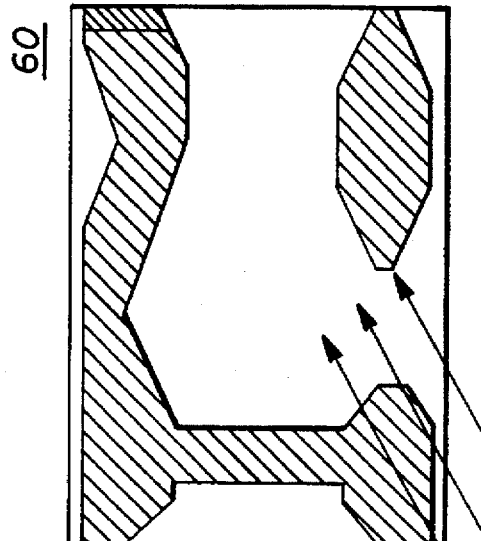
FIG. 5A illustrates the air flow direction across the slider of FIG. 4 when the slider is positioned near the inner radius of a rotating disk.
Figure 5B:
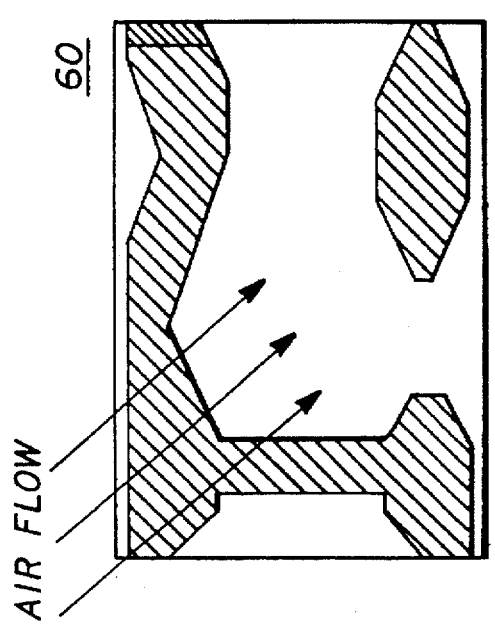
FIG. 5B illustrates the air flow direction across the slider of FIG. 4 when the slider is positioned between the inner radius and the center of the data zone of a rotating disk.
Figure 5C:
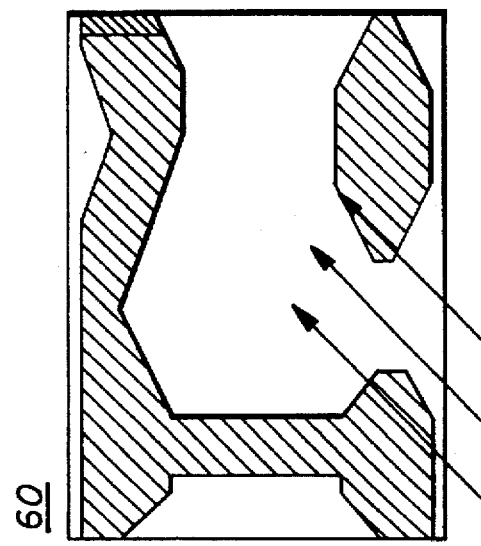
FIG. 5C illustrates the air flow direction across the slider of FIG. 4 when the slider is positioned at the center of the data zone of a rotating disk.
Figure 5D:
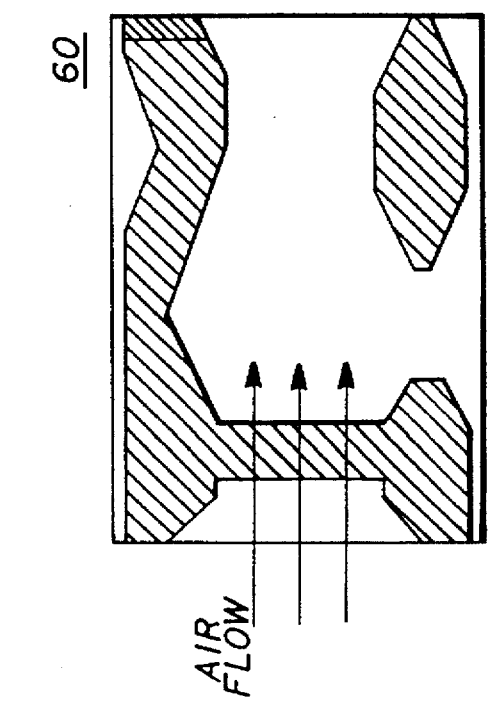
FIG. 5D illustrates the air flow direction across the slider of FIG. 4 when the slider is positioned near the outer radius of a rotating disk.

FIGS. 5A–D illustrate the direction of air flow relative to slider 60 as the slider moves from the inner radius to the outer radius of a disk. FIG. 5A illustrates the direction of air flow when slider 60 is positioned near the inner radius of the disk. FIG. 5B shows slider 60 at a position between the inner radius and the center of the disk. FIG. 5C shows slider 60 positioned at the center of the disk at a zero skew angle to the direction of air flow. Finally, FIG. 5D shows slider 60 positioned near the outer radius of the disk at a positive skew angle to the direction of air flow.

In one embodiment the slider body 60 has a width of 1.6 mm and a length of 2.0 mm. Rail 64 extends along the length and width of body 62 and has a width of approximately 0.25 mm. Rail 66 has a length and width of approximately 1.0 mm and 0.5 mm, respectively. Recess 68 has a depth of approximately 3.0 microns. Typically, the width of opening 82 will be approximately one quarter the length of body 52. Hence, in a slider having a body length of 2.0 mm, opening 82 has a width of approximately 0.5 mm. In the implementation of the present invention, it is important to position and size opening 82 in a manner that allows the negative pressure of cavity 68 to be spoiled across a relatively large range of skew angles. Moreover, it is important to control the width and depth of opening 82 to prevent the complete choking of air flow through the opening when the slider is in a negative skew orientation relative to the direction of air flow. Choking of the air flow is undesired since it can result in large instantaneous flow variations through the opening. This can cause random signal modulation. Moreover, it may result in the slider making contact with the disk surface causing an increased wear rate and damage to the disk's magnetic surface. In one embodiment, slider 60 comprises aluminum oxide titanium carbide. As known in the art, all of the preceding dimensions and materials can be varied to meet an array of design requirements without departing from the scope of the present invention.

FIG. 6 illustrates a slider 90 in another embodiment of the present invention having four separate rails 91-94 having air bearing surfaces positioned along the bottom surface of a slider body 96. Rails 91-94 define a subambient pressure cavity 98 having a spoiler opening 100 disposed along the inner side of the slider between rails 92 and 94. The function of opening 100 is to provide a variable air flow into cavity 98 as the skew of the slider relative to the direction of air flow changes between a negative and zero skew angle. In lieu of a continuous rail section that fully extends from the leading end 104 to the trailing end 106 of body 96, slider 90 includes non-continuous, overlapping rails 91 and 93. It is important to note that the opening 102 formed between rails 91 and 93 is oriented in a manner to minimize the amount of air flow passing into cavity 98 through the opening during disk drive operation. As illustrated by FIG. 6, implementation of the present invention is not limited by the geometric shape of the slider air bearing surfaces. For instance, in one embodiment rails 91-94 may comprise substantially symmetric shaped air bearing surfaces.

With the features described, the subambient pressure slider of the present invention can be designed to fly at a relatively constant flying height over a large range of slider skew angles. In addition, the slider may be designed such that the flying height is higher at the landing zone 59 (see FIG. 2) and lower along the data zone of the disk. Hence, the present invention is useful in accommodating zone textured disks.

Whereas many alternations and modifications to the present invention will no doubt become apparent to the person of ordinary skill in the art after having read the foregoing description, it is to be understood that the particular embodiments shown and described by way of illustration are in no way intended to be limiting.

What is claimed is:

1. A slider containing a transducer that is exposed to a flow of air, comprising:

a body having a first surface and an opposite second surface, said second surface including a leading end, a trailing end, an inner side and an outer side said body further having a length; and a pair of rails having a length extending from said leading end to said trailing end of said body, said rails defining a subambient pressure cavity wherein one of said rails has an opening into said cavity, said cavity opening having a width that is at least one-quarter the length of said body so that air will flow through said opening and into said cavity to increase the subambient pressure cavity.

2. The slider of claim 1 wherein said pair of rails comprises a first and second rail, said first rail being disposed along said inner side of said second surface, said second rail being disposed along said outer side of said second surface, each of said rails having at least one air bearing surface.

* * * * *